United States Patent [19]

Duncan et al.

[11] Patent Number: 5,190,643
[45] Date of Patent: Mar. 2, 1993

[54] WATER TREATMENT DEVICE HAVING MEANS TO COUNT TIMES USED AND LIMIT USEAGE

[75] Inventors: J. Kenneth Duncan, Solon; Wesley A. Schroeder, Uniontown, both of Ohio

[73] Assignee: Mr. Coffee, Inc., Bedford Heights, Ohio

[21] Appl. No.: 818,620

[22] Filed: Jan. 10, 1992

[51] Int. Cl.$^5$ .............................................. B01D 35/14
[52] U.S. Cl. ...................................... 210/85; 116/297; 116/298; 210/100; 210/282; 210/473; 222/23; 222/189; 222/544
[58] Field of Search ..................... 210/85, 91, 94, 100, 210/282, 473, 466, 467; 206/459, 534; 222/189, 544; 116/284, 291, 294, 297, 298; 215/230, 308

[56] References Cited

U.S. PATENT DOCUMENTS

| | | | |
|---|---|---|---|
| 1,223,971 | 4/1917 | Harvey | 215/230 |
| 2,987,187 | 6/1961 | Comroe | 210/282 |
| 3,762,440 | 12/1971 | Bryant | 137/551 |
| 4,011,829 | 3/1977 | Wachsmann et al. | 116/121 |
| 4,104,511 | 8/1978 | Rittenhouse | 235/132 R |
| 4,135,661 | 1/1979 | Filippini et al. | 235/132 R |
| 4,306,971 | 12/1981 | Hankammer | 210/282 |
| 4,365,722 | 12/1982 | Kramer | 215/220 |
| 4,562,933 | 1/1986 | Dennis | 215/219 |
| 4,623,457 | 11/1986 | Hankammer | 210/237 |
| 4,684,471 | 8/1987 | Manojlovic | 210/474 |
| 4,695,379 | 9/1987 | Nohren, Jr. et al. | 210/282 |
| 4,698,164 | 10/1987 | Ellis | 210/100 |
| 4,749,484 | 6/1988 | Greenhut | 210/266 |
| 4,769,135 | 9/1988 | Norton | 210/100 |
| 4,769,144 | 9/1988 | Nohren, Jr. | 210/282 |
| 4,772,386 | 9/1988 | Grout et al. | 210/91 |
| 4,877,119 | 10/1989 | Hosking | 206/534 |
| 4,895,648 | 1/1990 | Hankammer | 210/188 |
| 4,986,901 | 1/1991 | Nohren, Jr. et al. | 210/85 |
| 4,990,254 | 2/1991 | Toida et al. | 210/482 |
| 4,999,109 | 3/1991 | Sabre | 210/282 |
| 5,049,272 | 9/1991 | Nieweg | 210/282 |
| 5,139,666 | 8/1992 | Charbonneau et al. | 210/282 |

*Primary Examiner*—Joseph W. Drodge
*Attorney, Agent, or Firm*—D. Peter Hochberg; Mark Kusner

[57] ABSTRACT

A lid assembly for a portable water treatment device of the type including a vessel with an opened upper end and a replaceable filter cartridge adapted to be contained therein. A lid assembly is adapted to be attached to the opened upper end of the vessel above the replaceable filter cartridge and operable to monitor the number of times the water treatment device is used. The lid assembly includes a housing having a central aperture therethrough communicating with the filter cartridge. A gate member is reciprocally movable between a position closing the aperture in the housing and a position opening the aperture in the housing. In the opened position, water to be treated may be poured into the filter cartridge through the aperture. Indicator means are provided and are movable incrementally in response to movement of the gate member. The indicator means move one increment during a cyclic movement of the gate member from the closed position to the opened position and back to the closed position. Movement of the indicator is limited to a predetermined number of increments, the indicator preventing further movement of the gate member upon reaching a predetermined number of increments.

16 Claims, 11 Drawing Sheets

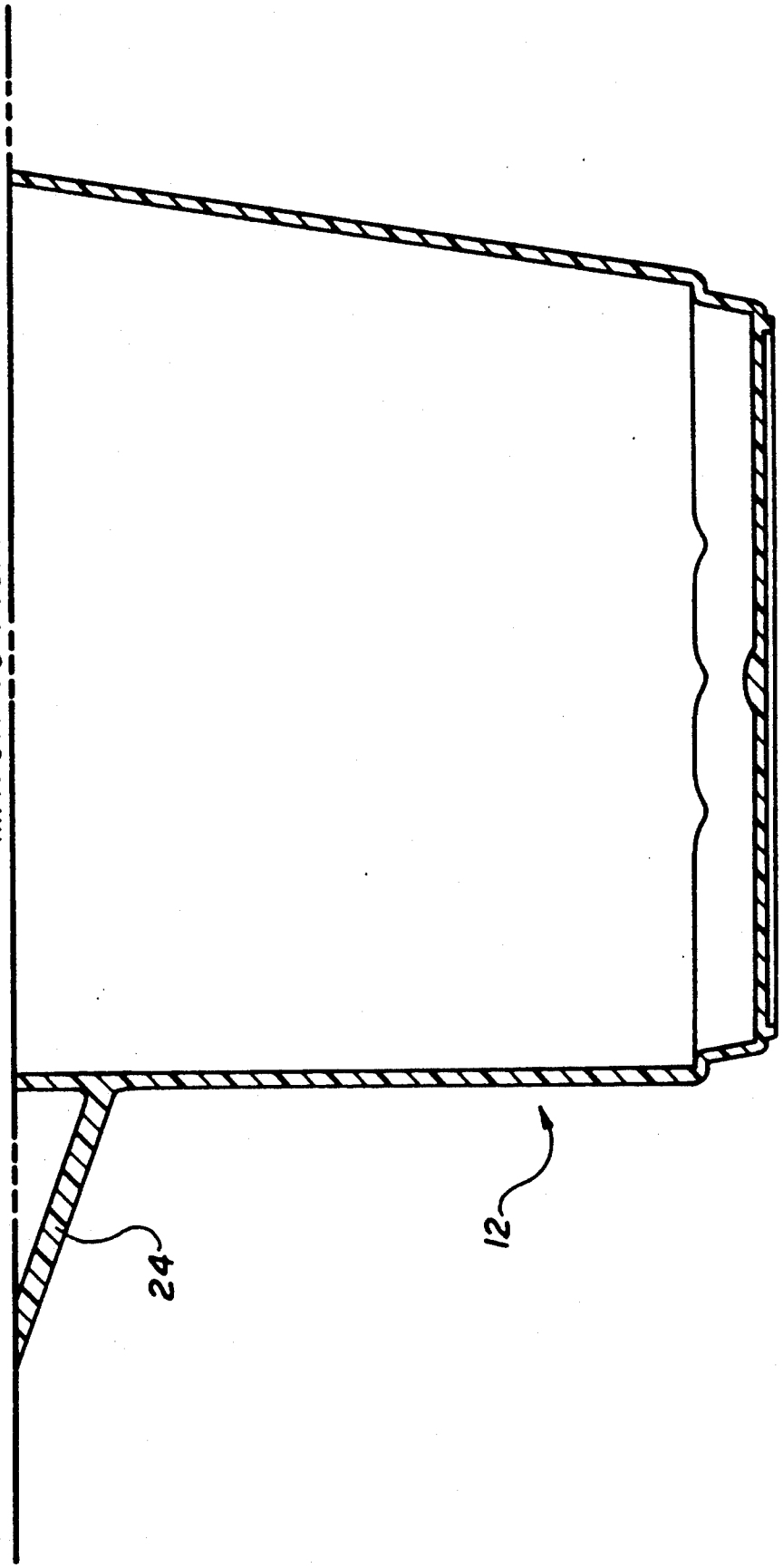

MATCH TO FIG. 3B

WATER TREATMENT DEVICE HAVING MEANS TO COUNT TIMES USED AND LIMIT USEAGE

FIELD OF THE INVENTION

The present invention relates generally to portable water filters and more particularly to a water filter containing a replaceable filter cartridge and a counter mechanism for monitoring the number of uses of the replaceable filter cartridge.

BACKGROUND OF THE INVENTION

Portable water treatment devices have become widely known and used in the home for removing contaminants from normal tap water. Such devices typically include a filter cartridge containing a purifying agent, such as activated charcoal. The filter cartridge has a limited life which is usually determined by the amount of water which can be filtered by the cartridge while maintaining a desired water quality. In this respect, after the rated life of a filter has been exceeded, the filtering characteristics of the filter deteriorate and some contaminants which the filter was designed to remove may remain in the filtered water. Thus, to ensure that a water treatment device operates at its maximum efficiency, it is necessary to monitor the number of uses of the device and replace the filter cartridge after the rated life of the filter cartridge has been reached.

Some existing water treatment devices suggest periodic replacement of a filter cartridge, such as on a monthly basis. Periodic replacement of a filter cartridge however, is unsatisfactory if the useful life of the filter cartridge is exceeded through heavy use of the device prior to the time for replacement. Still further, replacing a little used filter cartridge periodically is unnecessary and costly.

It is therefore desirable to accurately monitor the usage of the water treatment device to limit the volume of water filtered by the device to the rated volume of the filter cartridge. U.S. Pat. No. 4,986,901 to Nohren, Jr., et al., discloses a cap for a water treatment device having indicator means to keep track of how many times the treatment device in which the filter assembly is disposed has been filled and emptied. The indicator is manually advanced each time the treatment device is used. The problem with such device is that it is only accurate if the user remembers to advance the indicator wheel. Moreover, there is nothing to prohibit use of the device even after the maximum number of uses of the filter cartridge has been reached.

The present invention overcomes these and other problems and provides a portable water treatment device including means which automatically monitor use of the device, indicates when the life of the filter has exceeded its useful life, and deters further use of the treatment device.

SUMMARY OF THE INVENTION

In accordance with the present invention, there is provided a lid assembly for a portable water treatment device of the type including a vessel with an opened upper end and a replaceable filter cartridge adapted to be contained therein. The lid assembly is adapted to be attached to the opened upper end of the vessel above the replaceable filter cartridge and operable to monitor the number of times the water treatment device is used. The lid assembly includes a housing having a central aperture therethrough communicating with the filter cartridge. A gate member is reciprocally movable between a position closing the aperture in the housing and a position opening the aperture in the housing. In the opened position, water to be treated may be poured into the filter cartridge through the aperture. Indicator means are provided and are movable incrementally in response to movement of the gate member. The indicator means move one increment during a cyclic movement of the gate member from the closed position to the opened position and back to the closed position. Movement of the indicator is limited to a predetermined number of increments, the indicator preventing further movement of the gate member upon reaching a predetermined number of increments.

In accordance with another aspect of the present invention, there is a provided a portable water treatment device comprised of a vessel having an opened upper end and a pouring spout at the upper end. A replaceable filter cartridge is dimensioned to be contained within the vessel near the upper end thereof. A lid assembly for enclosing the upper end of the vessel is provided and includes a counting mechanism for monitoring uses of the water treatment device. The lid assembly is comprised of a housing having an aperture therethrough communicating with the filter cartridge. A movable gate member for opening and closing the aperture in the housing is provided wherein the gate member is movable between a position closing the aperture and a position opening the aperture. Counting means operatively engage the gate member and are incrementally movable along a predetermined path wherein the counting means moves one increment each time the gate member is opened and closed. Means are provided for preventing movement of the counting means in the gate after the counting means has moved a predetermined number of increments.

It is an object of the present invention to provide a portable water treatment device of a type having a replaceable filter cartridge therein including a mechanism for accurately monitoring and limiting the number of uses of the device to the useful life of the filter cartridge.

Another object of the present invention is to provide a water treatment device as described above which automatically monitors use of the device and prevents use thereof when the useful life of the filter cartridge has been reached.

Another object of the present invention is to provide a water treatment device as described above wherein a mechanism for monitoring uses of the purifier may be reset when a new filter cartridge is inserted in the treatment device.

Another object of the present invention is to provide a device as described above wherein the counting mechanism is incorporated within the lid or cover assembly of the water treatment device.

These and other objects and advantages will become apparent from the following description of a preferred embodiment, taken together with the accompanying drawings.

BRIEF DESCRIPTION OF THE DRAWINGS

The invention may take physical form in certain parts and arrangement of parts, a preferred embodiment of which will be described in detail in this specification and illustrated in the accompanying drawings which form a part hereto and wherein:

FIG. 2A and 2B are sectional views of the water treatment device shown in FIG. 1, taken along line 2—2 of FIG. 1;

BRIEF DESCRIPTION OF PREFERRED EMBODIMENT

Figure 1:
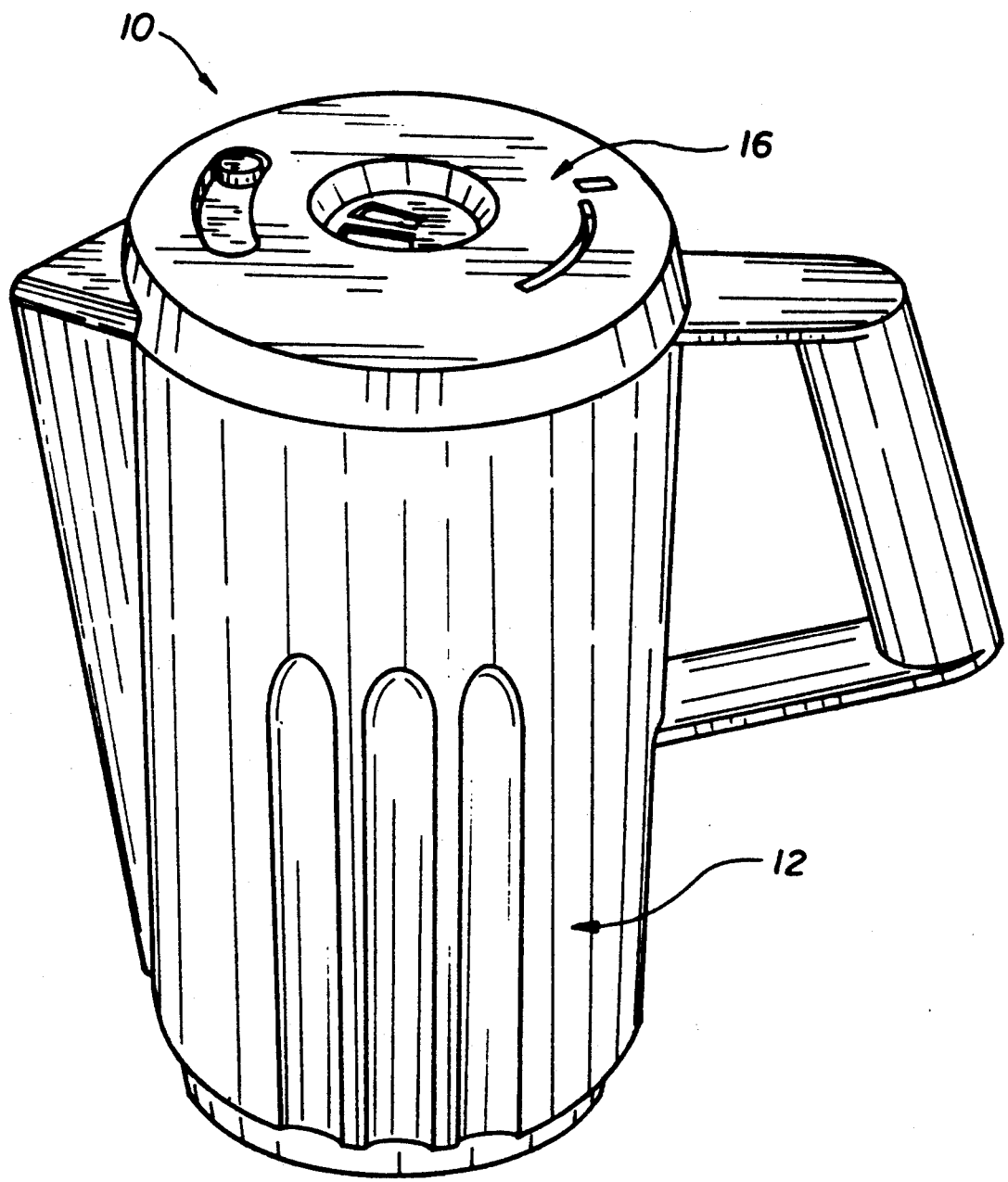
FIG. 1 is perspective view of a portable water treatment device illustrating a preferred embodiment of the present invention.

Referring now to the drawings wherein the showing for the purpose of illustrating a preferred embodiment of the invention only, and not for the purpose of limiting same, FIG. 1 shows a portable water treatment device 10 according to the present invention. Device 10 is generally comprised of a vessel 12, a replaceable filter cartridge 14, and a lid assembly 16.

In the embodiment shown, vessel 12 is generally cylindrical in shape with an opened upper end. Vessel 12 includes a pouring spout 22 which is formed and extends along one side thereof and a handle 24 on the opposite side thereof. A plurality of lid mounting slots 26, shown in phantom in FIB 2A, are formed into the inner surface of vessel 12.

Figure 2A:
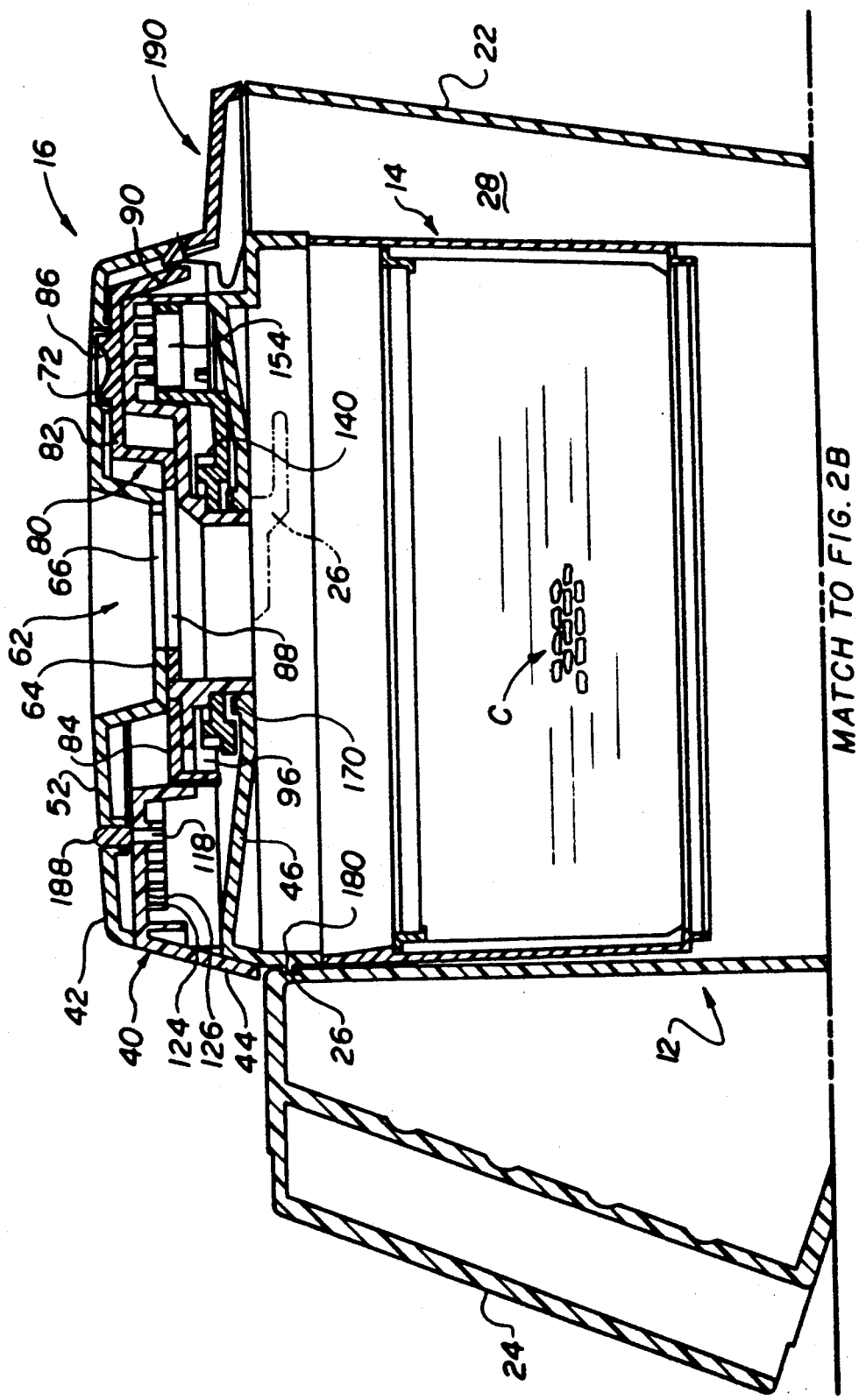

Vessel 12 is adapted to receive a replaceable filter cartridge 14 therein near the upper end thereof. Filter cartridge 14 is generally cylindrical in shape and contains a filtering agent or a media, such as activated charcoal, designated "C" in FIG. 2A. The specific content and characteristics of the filter media in and of themselves form no part of the present invention and therefore, will not be described. Filter cartridge 14 is shaped to be received within vessel 12 and supported therein near the upper edge of vessel 12. To this end, filter cartridge 14 is preferably cylindrical in shape and dimensioned to conform to the inner cylindrical shape of vessel 12 as shown. It will, of course, be appreciated that vessel 12 and filter cartridge 14 may assume other shapes, it being preferable, however, with respect to the present invention that the outer profile of filter cartridge 14 generally conform to the inner profile of vessel 12. As best seen in FIG. 2A and 2B, a passage 28 is formed by spout 22 adjacent filter cartridge 14. The inner surface of vessel 12 may include a plurality of vertical ribs (not shown) wherein the upper ends of such ribs can support and position filter cartridge 14.

Figure 3A:
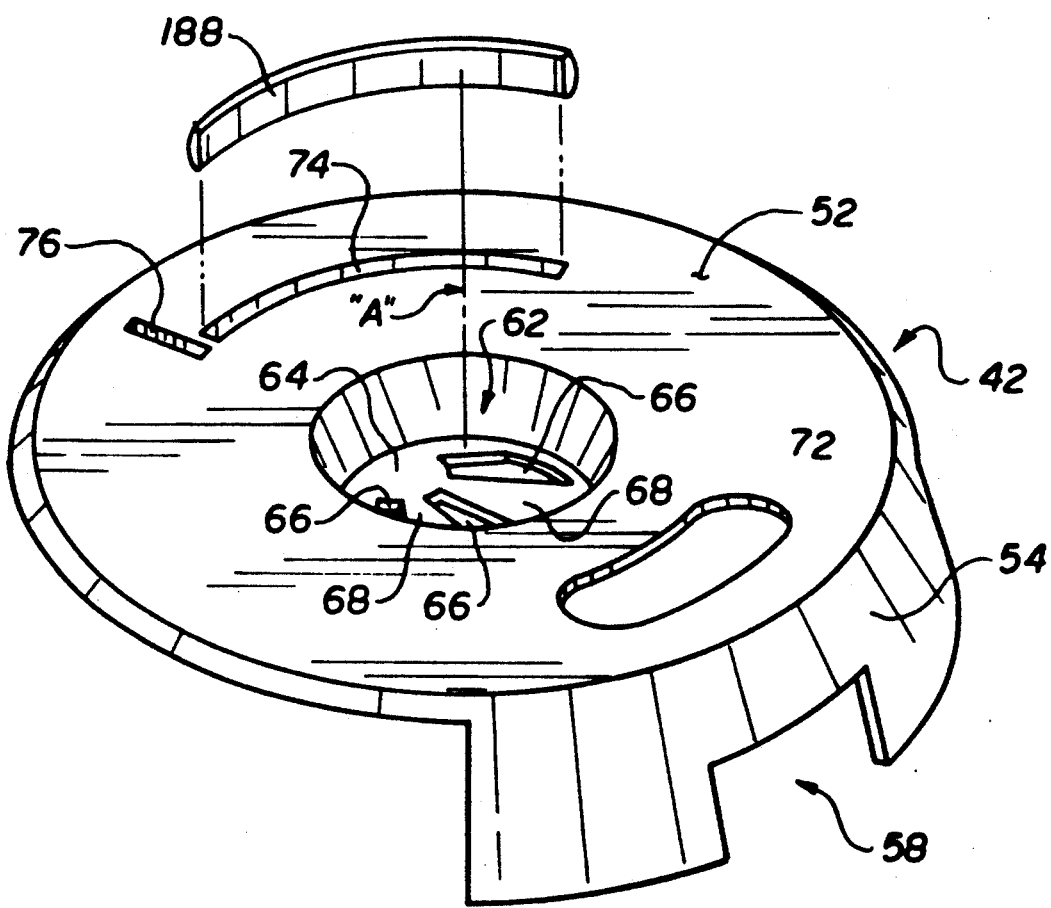
FIGS. 3A, 3B and 3C are enlarged, exploded views of a lid assembly of the water treatment device shown in FIG. 1.
Figure 3B:
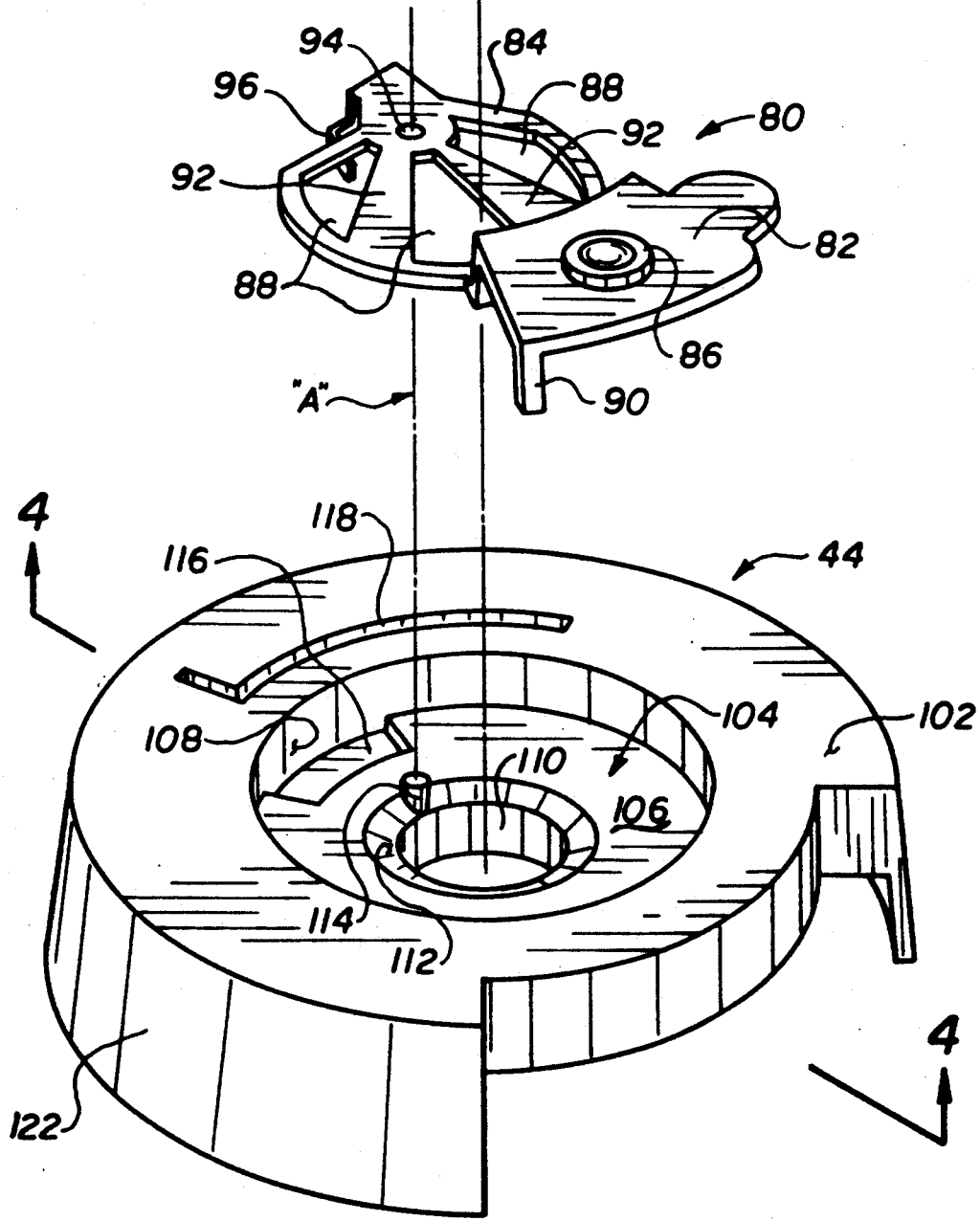
Figure 3C:
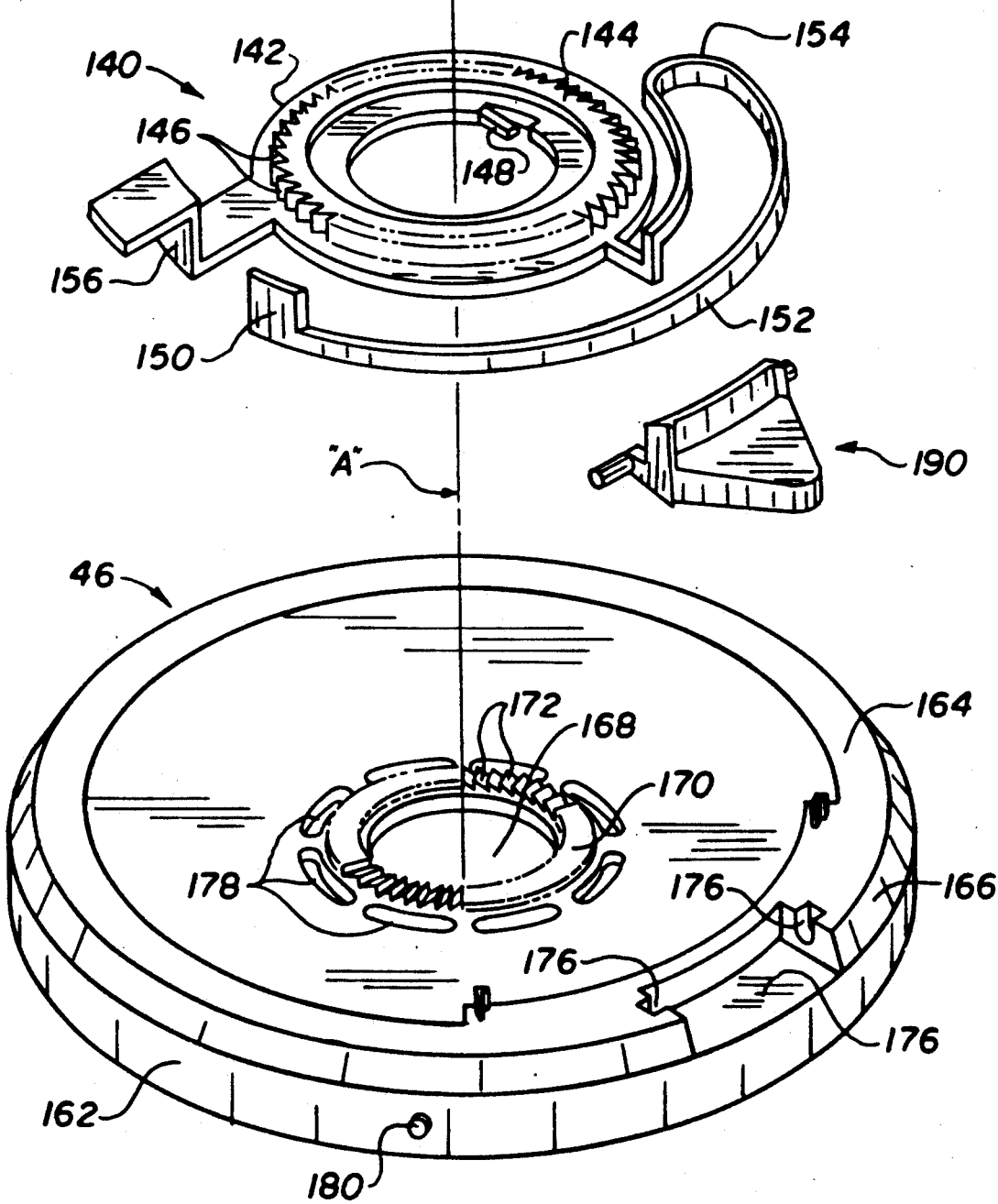

Referring now to FIGS. 3A-3C, an exploded view of lid assembly 16 is shown. According to the present invention, lid assembly 16 is adapted to be secured to the upper end of vessel 14 and maintain filter cartridge 14 therein. In addition to providing a cap or cover for vessel 12, lid assembly 16 also includes a counting mechanism to monitor and limit the number of uses of water treatment device 10. The counting mechanism is designed to limit the uses of water treatment device 10 to the useable life of the filter cartridge 14.

Lid assembly 16 is generally comprised of a three housing 40, which includes a top housing section 42 (best seen in FIG. 3A), an intermediate housing section 44 (best seen in FIG. 3B), and a base housing section 46 (best seen in FIG. 3C). Lid assembly 16 also includes an actuator/gate member 80, an advance member 140, and a spout lid 190.

Figure 7A:
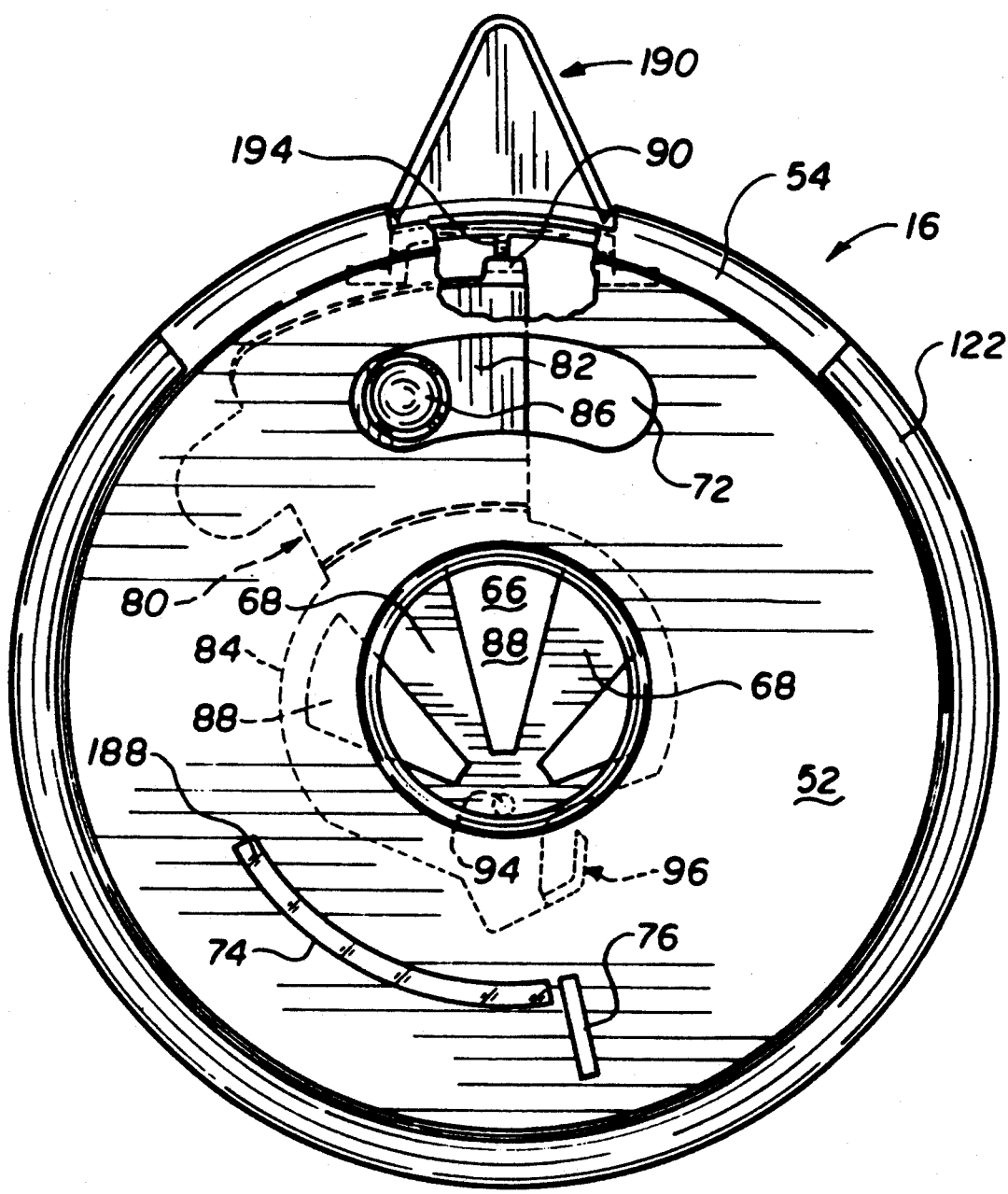
FIG. 7A is a partially sectioned, top plan view of the lid assembly showing the actuator/gate member (in phantom) in an opened position wherein water to be treated may be poured into the treatment device.

Top housing section 42 includes a flat circular wall 52 having a downward extending apron 54 extending from a portion of its peripheral edge. Apron 54 is formed to have a slightly conical outer surface profile and includes a rectangular notch 58 formed therein. A cylindrical recess 62 is formed in wall 52. Recess 62 is generally symmetrical about an axis, designated "A" in the drawings, which extends through housing 40. Recess 62 includes a flat bottom wall 64 which is parallel to top wall 52. Bottom wall 64 includes a plurality of generally wedge-shaped apertures 66 which define wedge-shaped wall portions 68, as best seen in FIG. 7A. Wedge-shaped apertures 66 and wall sections 68 radiate generally from a point located to one side of recess 62. Top housing section 42 also includes an actuator opening 72 disposed through wall 52, which opening 72 is disposed above notch 54 in apron 56. An indicator slot 74 is provided through wall 52. Indicator slot 74 is generally arcuate in shape and extends about the center of wall 52. At one end of indicator slot 74 a radially extending shorter key slot 76 is formed through wall 52.

Referring now to FIG. 3B, actuator/gate member 80 is shown. Actuator/gate member 80 is generally comprised of an actuator portion 82 and a gate portion 84. Actuator portion 82 and gate portion 84 are both generally flat and are preferably integrally formed such that gate portion 84 is parallel to and offset from actuator portion 82, as shown. Actuator portion 82 includes an actuator button 86 formed thereon, which button 86 has a "dished" inner portion and is dimensioned to be received within aperture 72 of top housing section 42. A downward extending stop 90 is formed at the outer corner of actuator portion 82. Referring now to gate portion 84, three wedge-shaped apertures 88 are formed therein, which apertures 88 are spaced apart by wedge-shaped walls 92. The sides of apertures 88 and walls 92 generally radiate outward from a common point. In the embodiment shown, wedge-shaped apertures 88 and wall portions 92 radiate outward from an axis which extends through a pivot hole or aperture 94. Adjacent aperture 94 on gate portion 84, a pawl 96 (best illustrated in phantom in FIG. 7A) is provided. Actuator/gate member 80 is formed such that pawl 96 is disposed below planar gate portion 84.

Figure 5:
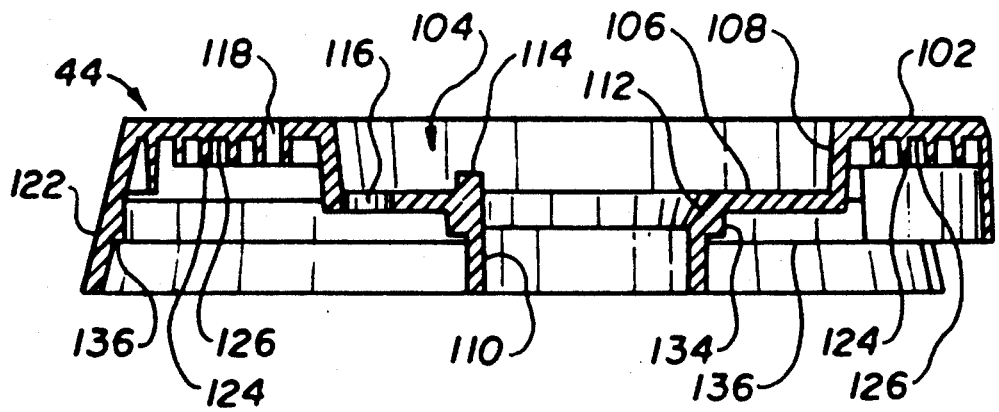
FIG. 5 is a sectional view taken along line 5—5 of FIG. 4.

Intermediate housing section 44 has a generally flat annular upper wall 102 with a cylindrical recess 104 formed therein. Recess 104 is symmetrical about axis "A" and is defined by a circular bottom wall 106 and a generally cylindrical side wall 108. A cylindrical hub 110 extends through intermediate housing section 44 along axis "A". As best seen in FIG. 5, wall 112 having a downward sloping, conical upper surface 112 is provided at the juncture of inner wall 106 and hub 110. A pivot pin 114 extends upward from surface 112. A slot 116 is formed through a portion of the outer edge of inner wall 106, and a generally L-shaped slot 118 is formed through upper wall 102. Slot 118 is dimensioned and positioned to be in registry with slots 74 and 76 in top housing section 42 when assembled therewith. As best seen in FIG. 3B, a generally conical skirt 122 extends downward from upper wall 102 of intermediate housing section 44. Skirt 122 extends around a major portion of upper wall 102 and is dimensioned to mate and conform with apron 54 on top housing section 44 when joined therewith.

Figure 4:
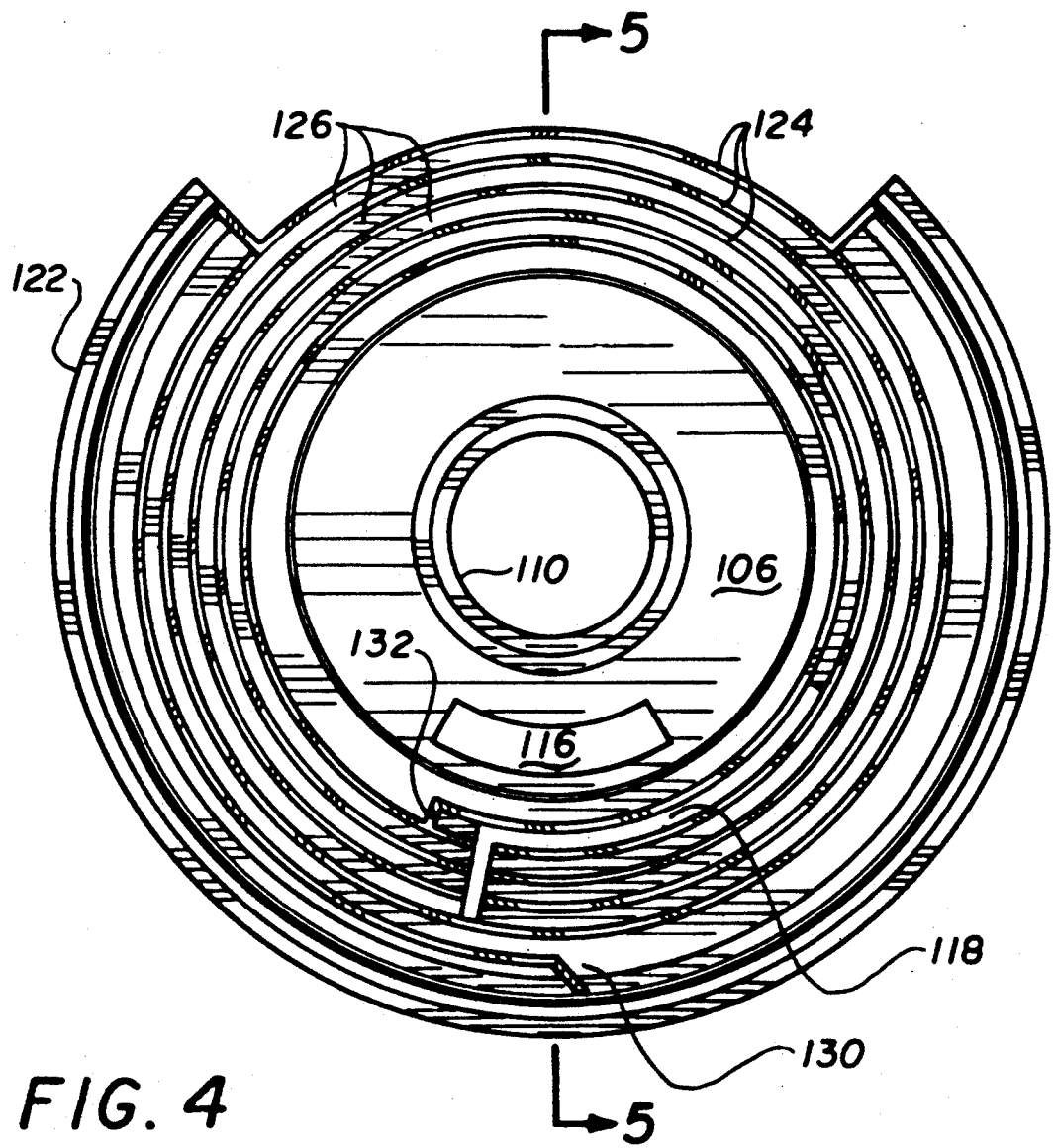
FIG. 4 is a bottom view taken along line 4—4 of FIG. 3C.

Referring now to FIGS. 4 and 5, the underside of intermediate housing section 44 is best seen. The underside of wall 102 includes a downward extending rail 124 which spirals inwardly from the outer edge of upper wall 102. Rail 124 defines a spiral track 126 on the underside of wall 102. Track 128 is of a predetermined length and has a beginning 130 near the outer edge of wall 102 and an end 132 nearer to axis "A". As best seen in FIG. 5, rail 124 near the beginning of track 126 extends a greater distance below wall 102. An L-shaped slot 118 is positioned to be aligned with track 126 near the end thereof, as best seen in FIG. 4. As best illustrated in FIG. 5, an annular shoulder 134 is provided below the sloping, conical upper surface at the juncture between annular wall 106 and hub 110. The underside of intermediate housing section 44 also includes a thin, downward facing annular surface 136 which extends inwardly from skirt 122 and is best seen in FIG. 5.

Referring now to FIG. 3C, advance member 140 is shown. Advance member 140 is generally a flat annular disc 142 having an annular toothed gear 144 integrally formed on the upper surface thereof. Gear 144 has a plurality of outward extending triangular teeth 146. An obliquely set tab 148 extends downward from disc 142, the free end of tab 148 being below the lower surface of disc 142. A follower 150 is provided at the end of a resilient arm 152. Arm 152 is disposed to one side of disc 142 and is formed to have a U-shaped coil or hinged portion 154. A stop arm 156 extends from one side of disc 142. According to the present invention, advance member 140 is preferably integrally formed of a tough, yet resilient plastic material whereby arm 152 has a resilient spring quality.

Bottom housing section 46 is generally a conical plate having an outer peripheral edge formed by a cylindrical side wall 162, an annular, upward facing wall 164, and a sloping wall 166. The interior of base housing section 46 slopes inwardly (as best seen in FIG. 2A) towards a central circular aperture 168. Aperture 168 is dimensioned to snugly receive hub 110 of intermediate housing section 44 therethrough. An annular ring 170 of aligned upward facing triangular teeth 172 is formed around the edges of aperture 168. A plurality of drain slots 178 surround tooth ring 170. A rectangular notch 176 having pin receiving slots 178 is formed in the peripheral edge of base housing section 46, and a plurality of spaced-apart locking pins 180 project outward from sidewall 162.

Spout lid 190 is provided to close the upper end of spout 22 of vessel 12. Lid 190 includes a pair of aligned pivot pins 192 extending laterally therefrom. A rib 194 (best seen in FIG. 7A) is provided along the backside of spout cover 190.

Each of the foregoing components of lid assembly 16 are preferably formed of a resilient plastic material. In the embodiment shown, housing sections 42, 44 and 46 are formed of Cycolac "T" FDA grade and advance wheel 140 and actuator/gate member 80 are formed of an acetal material. The overall construction of lid assembly 16 is best seen in FIG. 2A. In this respect, intermediate housing section 44 is attached to base housing section 46 with advance wheel 140 captured therebetween on hub 110. Advance member 140 is rotatable about hub 110 and positioned thereon by shoulder 134. Downward facing annular surface 136 formed on the interior portion of intermediate housing section 44 abuts upward facing annular wall 164 of base housing section 46 to position housing section 44 relative thereto. In this position, hub 110 extends through aperture 168 in base housing section 44. Housing sections 44 and 46 are secured together preferably by ultrasonic welding. Tab 148 which extends downward below disc 142 of advance wheel 140 is disposed to operatively engage teeth 172 of ring 170. In this respect, tab 148 is resilient and inclined downward for engagement with teeth 172. As will be described in greater detail below, in the embodiment shown, tab 148 and teeth 172 are operable to permit advance member 140 to rotate in a counterclockwise direction, but to prevent rotation of advance wheel 140 in a clockwise direction. With advance member 140 positioned between intermediate housing section 44 and base housing section 146, follower 150 on arm 152 is disposed within track 126 and is operable to slide through track 126, i.e. spiral inwardly, as advance member 140 rotates on hub 110.

Referring now to the upper side of intermediate housing section 44, actuator/gate member 80 is pivotally mounted on pivot pin 114 of intermediate housing section 44, pivot pin 114 extending through aperture 94 of actuator/gate member 80. Actuator/gate member 80 is dimensioned such that actuator portion 82 slides along annular upper wall 102 and gate portion 84 slides on inner wall 106 of recess 104. Tab 96 which extends obliquely from gate portion 84 extends through opening 116 in intermediate housing section 44 and operatively engages teeth 146 of gear 144 on advance wheel 140. As will be described in greater detail below, movement of actuator/gate member 80 is operable to move advance member 140 in a counterclockwise direction.

Top housing section 42 is secured to intermediate housing section 44 with actuator/gate member 80 and spout lid 190 disposed therebetween. Apron 54 of top housing section 42 mates with skirt 122 of intermediate housing section 144 to form a continuous smooth outer profile. Actuator button 86 extends into and is accessible through opening 72 in top housing section 42. Importantly, recess 62 of top housing section 42 is disposed above gate portion 84 of actuator/gate member 80 with the wedge-shaped opening 66 in top housing section 42 positioned above and in general alignment with the wedge-shaped openings 88 in gate portion 84 of actuator/gate member 80. A clear bezel 188 is disposed within indicator slot 74 of top housing section 42 best seen in FIG. 2A. Spout lid 190 is confined within notch 176 of base housing section 46 by apron 54 of top housing section 42. In this respect, mounting pins 192 are positioned within pin slots 178 which are adjacent notch 176 in base housing section 46. Spout cover 190 is thus pivotable about an axis through mounting pins 192.

Lid assembly 16 as heretofore described is thus preferably formed as an integral unit and is utilized as part of a portable water treatment appliance 10 of the type which utilizes a replaceable filter cartridge 14.

Figure 8A:
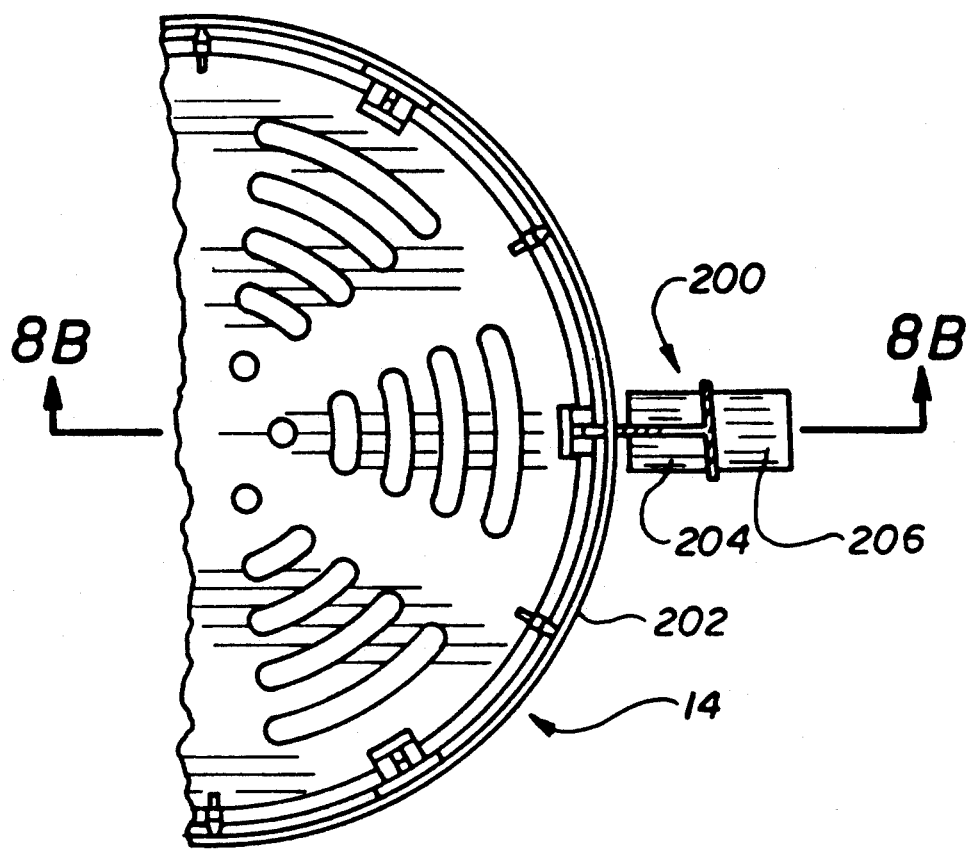
FIG. 8A is a partial top plan view of a replacement filter cartridge housing showing a reset key mounted thereto.
Figure 8B:
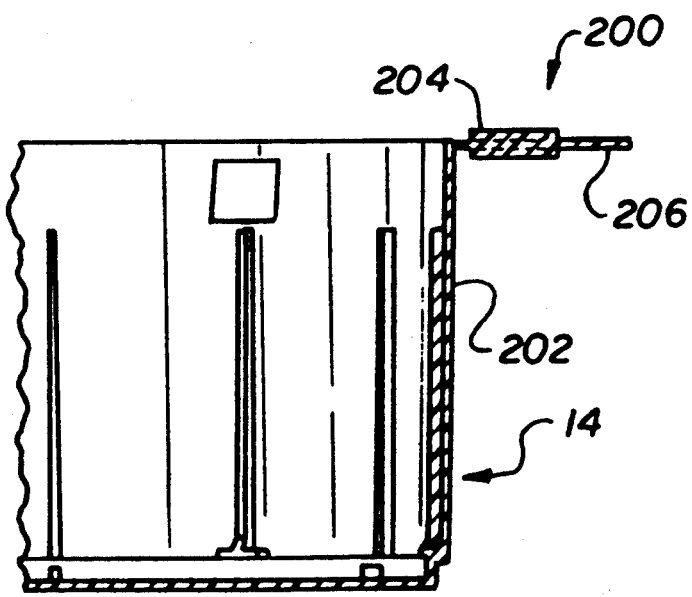
FIG. 8B is a partial, side elevational view of the filter cartridge housing shown in FIG. 8A showing the reset key thereon.

According to one aspect of the present invention, lid assembly 16 is operable to monitor the number of uses of the water treatment device 10 and to prevent use of the device once the useful life of filter cartridge 14 has been reached. In this respect lid assembly 16 basically includes a counting mechanism which monitors each use of the water treatment device. According to the present invention, the counting mechanism is resettable to a "zero count" or "beginning count" when a new cartridge 14 is inserted within treatment device 10. To this end, a key 200 is provided to reset the counting mechanism within lid assembly 16. Key 200 is preferably provided with each replacement filter cartridge 14 wherein the counter mechanism may be reset when the spent, i.e. used, cartridge is replaced with a new filter cartridge. FIGS. 8A and 8B show a filter cartridge housing 202 having key 200 molded as an integral part thereof. Key 200 is preferably molded in such a way that it may be broken off a new filter cartridge, and prior to the filter cartridge 14 being inserted into vessel 12. Key 200 includes a grip portion 206 which is dimensioned to be inserted and received into slot 76 of housing section 42.

Referring now to the operation of treatment device 10, a cartridge 14 is placed within vessel 12 as shown in FIGS. 2A and 2B. Lid assembly 16 is locked into position in vessel 12 by means of locking pins 180 which are rotated into slots 26 provided at the upper end of vessel 12. In this respect, slots 26 in vessel 12 and locking pins 180 on lid assembly 16 are relatively disposed such that when lid assembly 16 is locked into position, spout lid 190 is positioned over spout 22. Lid assembly 16 and filter cartridge 14 are preferably dimensioned such that the lower edge of base housing section 46 of lid assembly 16 abuts against the upper edge of cartridge 14. The abutting the respective edges of lid assembly 16 and cartridge 14 ensures that water poured through lid assembly 16 will flows onto and through filter 14 and be filtered thereby.

Figure 7B:
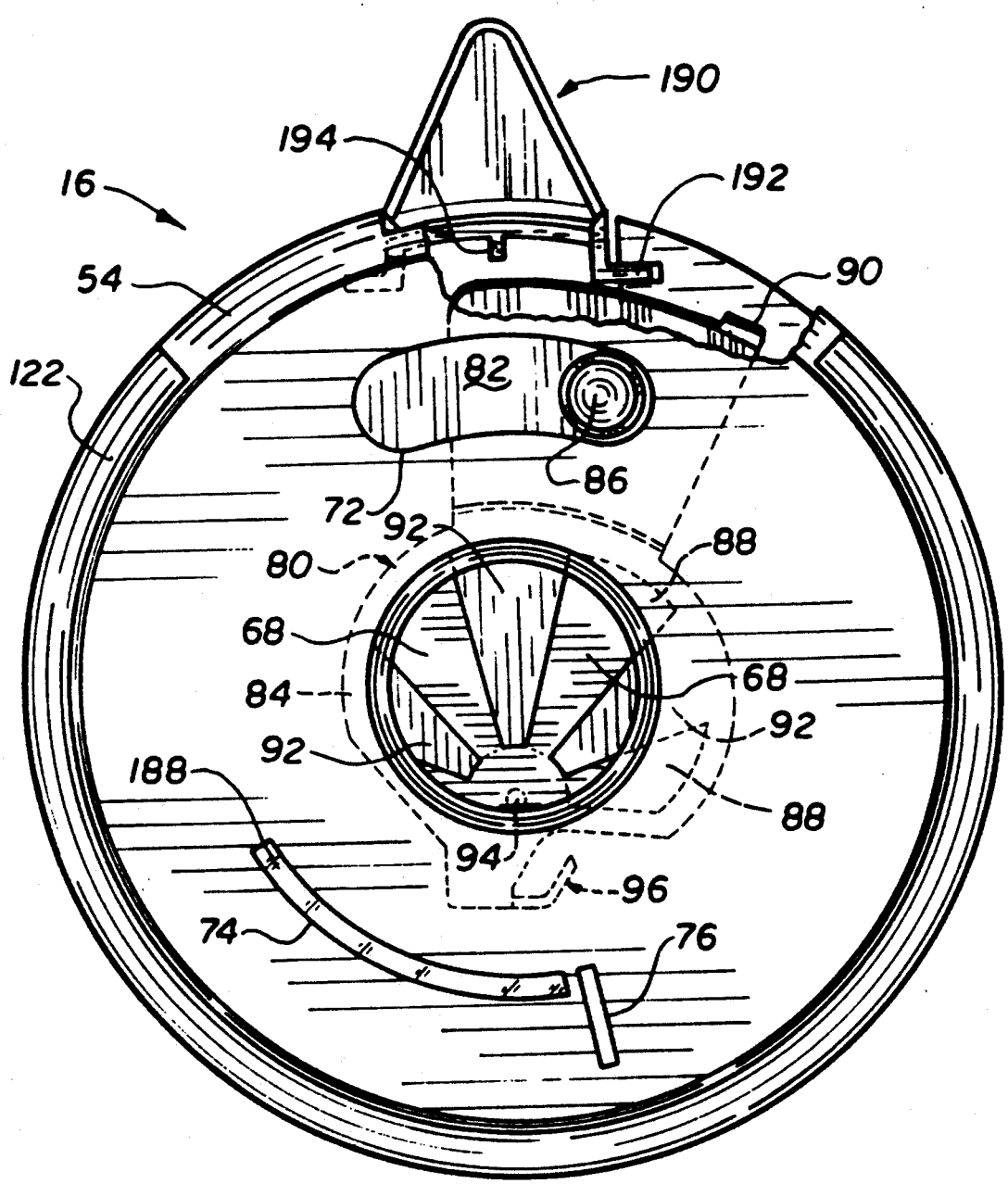
FIG. 7B is a top plan view of the lid assembly showing the actuator/gate member in a closed position wherein water treated within the treatment device may be poured from the device.

With lid assembly 16 in place in vessel 12, water to be treated may be inserted through apertures 66, 88 in top housing section 42 and acuator/gate member 80 respectively. With respect to pouring water into filter cartridge 14, according to the present invention, actuator/gate member 80 is movable between a first "closed" position as best seen in FIG. 7B to a second "opened" position as illustrated in FIG. 7A. Actuator/gate member is moved by means of actuator button 86 which extends through opening 72 of top housing section 42. In the "opened" position, wedge-shaped apertures 88 of actuator/gate member 80 are aligned with wedge-shaped apertures 66 of top housing section 42 and thereby permit water to flow therethrough into filter cartridge 14. Water which flows through and is filtered by filter cartridge 18 is collected in vessel 12. According to the present invention, when actuator/gate member 80 is in the second "opened" position, stop 90 on actuator/gate member 80 is positioned adjacent rib 194 of spout lid 190. In this position, stop 90 prevents spout lid 190 from being moved from its closed or spout covering position to an opened position. In other words, spout lid 190 is locked in a closed position when actuator/gate member 80 is in an "opened" position to receive water to be filtered.

To enable the filtered water within vessel 12 to be poured therefrom, it is necessary to move actuator/gate member 80 to its "closed" position shown in FIG. 7B. In this position, stop 90 has been moved away from rib 194 of spout lid 190 thereby enabling spout lid 190 to be opened and the filtered water to be poured from vessel 12. Thus, according to the present invention, to use treatment appliance 10 it is necessary to repeatedly move actuator/gate member 80 between its "closed" and "opened" positions. According to one aspect of the present invention, this cyclic movement of actuator/gate member 80 from the closed position to the opened position and then back to the closed position, operates the counting mechanism which monitors the number of uses of filter cartridge 14 which, as indicated above, has a limited life and should be replaced after a predetermined number of uses.

Referring now more specifically to the operation of the treatment device 10, such device would typically be found with actuator/gate member in its first or "closed" position as shown in FIG. 7B. Actuator/gate member 80 must be moved to the "opened" position to enable water to be treated to be poured into filter cartridge 14. Importantly, as actuator/gate member 80 is pivoted on pivot pin 114 to move it to its "opened" position, pawl 96 adjacent pivot pin 114 engages the radially extending face of a tooth 146 on gear 144 on the upper surface of disc 142 of advance member 140 and causes such member to rotate a predetermined angular distance on hub 110 in a counterclockwise direction. As advance member 140 moves, resilient tab 148 which extends obliquely downward from disc 142 of advance member 140 slides up the sloping, inclined surface of a tooth 172 of ring 170 on base housing section 46 until it passes the apex of such tooth 172, wherein it snaps into the valley or void defined between adjacent teeth 172. In the embodiment shown, movement of actuator/gate member 80 from the first "closed" position to the second "opened" position, causes tab 148 to move, i.e. snap, over one tooth 172 of ring 170.

When actuator/gate member 80 is returned to the second closed position, i.e. to release spout cover 190 and enable the filtered water to be poured from vessel 12, advance member 140 is maintained stationary and prevented from rotating in a clockwise direction by tab 148 which abuts the flat, vertical surface of the tooth 172 it had just slid over. With advance member 140 restrained from clockwise movement, resilient pawl 96 on actuator/gate member 80 slides on the sloping surface of a tooth 146 of gear 144 on advance wheel 140 until it snaps into the cavity defined between adjacent teeth 146. Thus, for each cycle of motion of actuator/gate member 80 from its second "closed" position to its first "opened" position and then back to its second "closed" position, advance member 140 is rotated a predetermined incremental amount on hub 110. In this respect, each incremental advance represents one use of filter cartridge 14. Importantly as advance wheel 140 incrementally moves on hub 110, follower 150 on arm 152 is drawn along through track 126 formed on the underside of intermediate housing section 44. Track 126 is dimensioned to have a length from beginning 130 to end 132 wherein follower 150 will travel the length of track 126 and be at the end 132 of track 126 after a predetermined number of incremental advances by advance wheel 140, the number of incremental advances being equal to the preferred number of uses of filter cartridge 14.

Stop arm 156 on advance wheel 140 is provided behind follower 150 to prevent further movement of advance wheel 140 once follower 150 has reached end 132 of track 126. In this respect, as indicated above, arm 152 has resilient spring-like characteristics which allows follower 150 to follow track 126 inward toward the center of intermediate housing section 44. With stop 156 behind follower 150, movement of advance wheel 140 is prevented when follower 150 is at the end of track 126.

In the embodiment shown, slot 74 in top housing section 42 includes clear bezel 188 and is positioned to provide an indication when follower 150 is near the end of track 126. In this respect, the upper edge of follower 150 is preferably colored red to show through bezel 188 to provide indication to the user when a limited number of uses of filter cartridge 14 remains. The present invention thus provides a treatment device 10 and a lid assembly 16 which monitors the number of uses of the device and prevents further use of the filtering device 10 when the number of uses of filter cartridge 14 has been reached.

Figure 6:
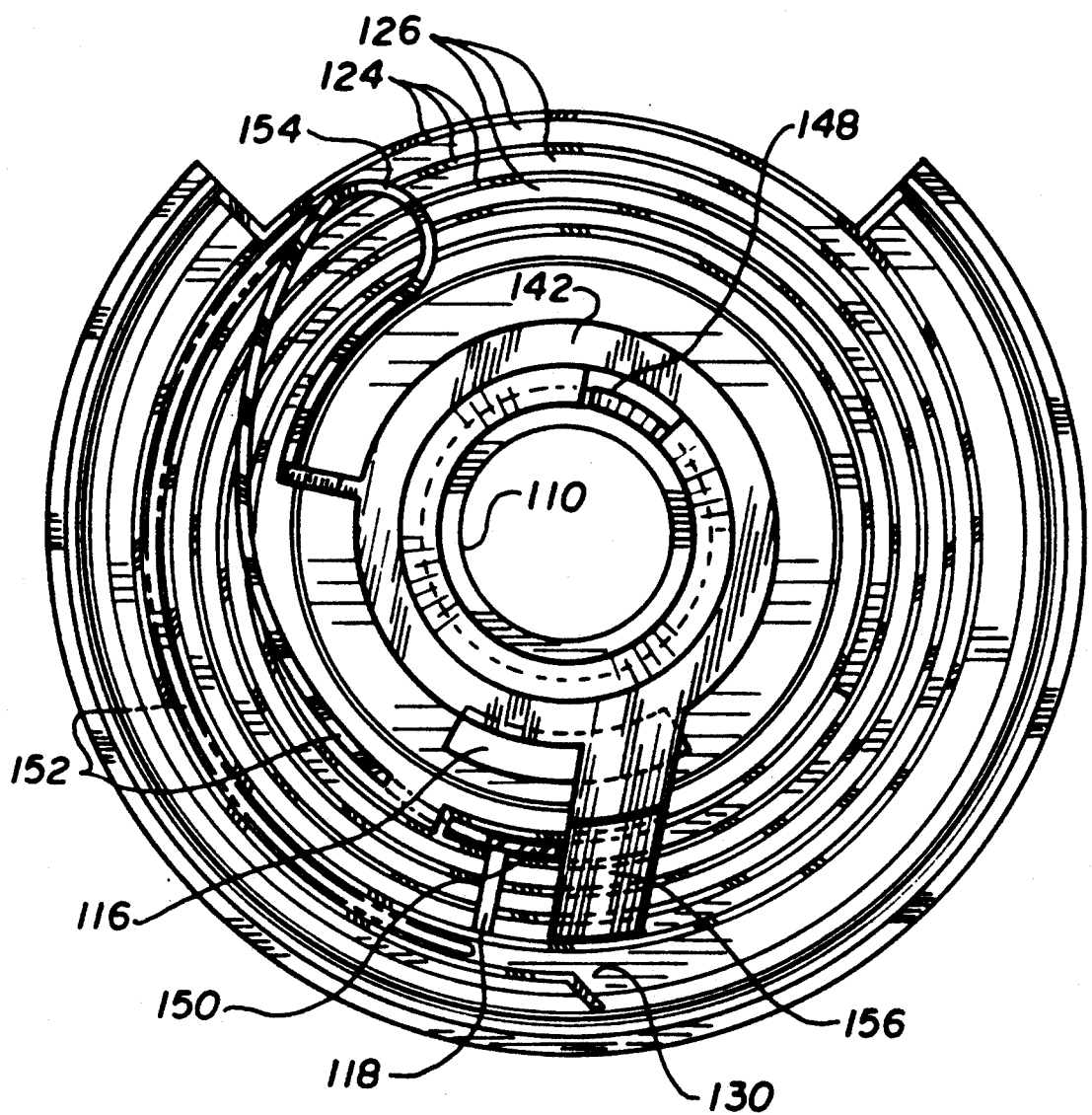
FIG. 6 is a bottom view of an intermediate housing section of the lid assembly showing an advance/counter wheel mounted thereon.

In accordance with another aspect of the present invention, the counting mechanism of lid assembly 16 may be reset when a new filter cartridge is placed within vessel 12. In this respect, key 200 is operable to reset the counting mechanism (i.e. reposition follower 150 to the beginning of track 126) when a new filter cartridge 14 is inserted within vessel 12. In this respect, key portion 206 of key 200 is dimensioned to be inserted into radially extending slot 76 in top housing section 42. As indicated above, slot 76 is in registry and alignment with the shorter leg portion of L-shaped slot 118 in intermediate housing section 44. Thus, key portion 206 is dimensioned to extend through walls 52 and 102 of top housing section 42 and intermediate housing section 44 and beyond rail 124 such that it forces follower 150 out of track 126. When forced out of track 126, the inherent resiliency and spring in arm 152 causes follower 150 to move (i.e. jump) outward toward the beginning of track 126, as best illustrated in FIG. 6, which shows follower 150 at the end of track 126 and shows in phantom the position of follower 150 when reset. The higher rail section at beginning of track 126 stops follower 150 from moving past the beginning of track 126. At this position, follower 150 drops back into track 126 and is in its initial position from which it can be moved through track 126 during use of the newly inserted cartridge 14.

The present invention thus provides a water treatment appliance 10 having means for monitoring the number of uses of the filter cartridge used therein and further provides an indication when the useful life of the filter cartridge has been reached. The present invention has been described with respect to a preferred embodiment. Modifications and alterations will occur to others upon a reading and understanding of the specification. It is intended that all such modifications and alterations be included insofar as they come within the scope of the invention as claimed or the equivalents thereof.

Thus, having described the invention, the following is claimed:

1. A portable water treatment device comprised of:
    a vessel having a pouring spout at the upper end thereof,
    a replaceable filter cartridge containing a filter media, and
    a lid assembly for enclosing the upper end of said vessel, said lid assembly including a counting mechanism for monitoring uses of water treatment device and comprising:
        housing means having an aperture therethrough communicating with said filter cartridge,
        a movable gate member for opening and closing said aperture in said housing, said gate member movable between a position closing said aperture and a position opening said aperture,
        counting means incrementally movable along a predetermined path, said counting means operably engaging said gate member wherein said counting means moves one increment each time each said gate member is opened and closed, and
        means for preventing movement of said counting means and said gate member after said gate member has moved a predetermined number of increments.

2. A water treatment device as defined in claim 1 wherein said lid assembly includes means for resetting said counting means.

3. A water treatment device as defined in claim 1 wherein said counting means is a generally circular disc movable in angular increments.

4. A water treatment device as defined in claim 3 wherein said disc includes a plurality of annular teeth disposed about the periphery thereof and said gate member includes a resilient pawl element for engaging said teeth.

5. A water treatment device as defined in claim 1 wherein said vessel includes a spout for pouring filtered water from said vessel, and said lid assembly includes a spout lid movable between an opened and closed position, said gate member including means for locking said spout lid in said closed position when said gate member is in said second position.

6. A water treatment device as defined in claim 1 wherein said lid assembly includes means for resetting said counting means to permit said counting means to move said predetermined number of increments.

7. A water treatment device as defined in claim 1 wherein:
    said counting means is a disc rotatable about an axis through said housing and includes a toothed ring having a predetermined number of teeth thereon,
    said gate member includes a pawl engaging said toothed ring which is operable to rotate said disc about said axis during a cyclic movement of said gate member.

8. A water treatment device as defined in claim 7 further comprising track means within said housing defining a track of predetermined length, said disc including a resilient arm extending therefrom and a follower at the end of said arm, said follower operable to move along track as said disc rotates about said axis.

9. In a portable water treatment device of the type having a vessel with an opened upper end and a replaceable filter cartridge adapted to be contained within said vessel, a lid assembly for monitoring the number of times the treatment device is used, said lid assembly comprising:
    a housing adapted to be attached to the opened upper end of said vessel above said replaceable filter cartridge, said housing having a central aperture communicating with said filter cartridge,
    a gate member cyclically movable between a position opening said aperture in said housing such that water to be treated may be poured into said filter cartridge through said aperture, and a position closing said aperture in said housing.

counting means in operative engagement with said gate member and movable incrementally in response to movement of said gate member, said counting means moving one increment during a cyclic movement of said gate member from said closed position to said opened position and back to said closed position, and means for limiting movement of said counting means to a predetermined number of increment and for preventing further movement of said gate member upon reaching said predetermined number of increments.

10. A lid assembly as defined in claim 9 wherein said vessel includes a spout for pouring filtered water from said vessel, and said lid assembly includes a spout lid movable between an opened and closed position, said gate member including means for locking said spout lid in said closed position when said gate member is in said opened position.

11. A lid assembly as defined in claim 9 wherein said counting means is an annular disc movable in annular increments about an axis.

12. A lid assembly as defined in claim 9 wherein said lid assembly includes means for resetting said counting means to permit said indicator to move said predetermined number of increments.

13. In a portable water treatment device of the type having a vessel with an opened upper end and a replaceable filter cartridge adapted to be contained within said vessel, a lid assembly attachable to said vessel for monitoring the number of times the treatment device is used, said lid assembly comprising:

a housing adapted to be attached to the opened upper end of said vessel above said replaceable filter cartridge, said housing having a central aperture communicating with said filter cartridge, a gate member cyclically movable between a position opening said aperture in said housing such that water to be treated may be poured into said filter cartridge through said aperture, and a position closing said aperture in said housing, counting means in operative engagement with said gate member and movable incrementally in response to movement of said gate member, said counting means moving one increment during a cyclic movement of said gate member from said closed position to said opened position and back to said closed position, means for limiting movement of said counting means to a predetermined number of increments and for preventing further movement of said gate member upon reaching said predetermined number of increments, said counting means is a disc rotatable about an axis through said housing and includes a toothed ring having a predetermined number of teeth thereon, and said gate member includes a pawl engaging said toothed ring which is operable to rotate said disc about said axis during a cyclic movement of said gate member.

14. A lid assembly as defined in claim 13 further comprising track means within said housing defining a track of predetermined length, said counting means including a resilient arm extending therefrom and a follower at the end of said arm, said follower operable to move along said track as said disc rotates about said axis.

15. A lid assembly as defined in claim 14 wherein said track defines a spiral path about said axis and has an outermost beginning and an innermost end, said follower movable toward said end as said counting means moves, said path having a length wherein said follower moves from said beginning thereof to the end thereof after a predetermined number of incremental advances by said counting means.

16. A lid assembly as defined in claim 15 wherein said follower is normally biased by a biassing force outwardly away from said axis when said follower is in said track, said follower being removable from said track when at the end thereof, wherein said biassing force moves said follower to said beginning of said track.

* * * * *